(12) United States Patent
Soeda

(10) Patent No.: US 7,869,086 B2
(45) Date of Patent: Jan. 11, 2011

(54) OFFSET ADJUSTING DEVICE, CORRECTING DEVICE, AND METHOD OF ADJUSTING ANALOG IMAGE SIGNAL

(75) Inventor: Yoshihisa Soeda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1043 days.

(21) Appl. No.: 11/633,023

(22) Filed: Dec. 4, 2006

(65) Prior Publication Data

US 2007/0127046 A1 Jun. 7, 2007

(30) Foreign Application Priority Data

Dec. 5, 2005 (JP) .............................. 2005-350470

(51) Int. Cl.
G06F 15/00 (2006.01)
G06K 9/72 (2006.01)

(52) U.S. Cl. .................. 358/1.9; 358/443; 358/446; 358/451; 358/529; 348/229.1; 348/230.1; 348/294

(58) Field of Classification Search .................. 358/1.9, 358/446, 461, 529, 443; 348/229.1, 230.1, 348/294

See application file for complete search history.

(56) References Cited

U.S. PATENT DOCUMENTS

| | | | | |
|---|---|---|---|---|
| 4,928,172 A | * | 5/1990 | Uehara et al. | 348/69 |
| 5,157,518 A | * | 10/1992 | Ohtaki et al. | 358/461 |
| 5,187,583 A | * | 2/1993 | Hamasaki | 348/250 |
| 5,408,335 A | * | 4/1995 | Takahashi et al. | 358/443 |
| 5,513,016 A | * | 4/1996 | Inoue | 358/3.26 |
| 6,049,355 A | | 4/2000 | Kameyama | |
| 6,867,885 B2 | * | 3/2005 | Inage | 358/443 |
| 7,324,236 B2 | * | 1/2008 | Ohashi | 358/1.18 |
| 7,423,784 B2 | * | 9/2008 | Tanabe et al. | 358/461 |
| 7,536,281 B2 | * | 5/2009 | Ternent et al. | 702/190 |
| 2002/0012127 A1 | | 1/2002 | Soeda | |

(Continued)

FOREIGN PATENT DOCUMENTS

JP 09-284598 10/1997

(Continued)

OTHER PUBLICATIONS

U.S. Appl. No. 11/484,641, filed Jul. 12, 2006, Soeda.

(Continued)

*Primary Examiner*—Twyler L Haskins
*Assistant Examiner*—Dennis Dicker
(74) *Attorney, Agent, or Firm*—Harness, Dickey & Pierce, P.L.C.

(57) ABSTRACT

An offset adjusting device includes a sample-hold unit that sample-holds an analog image signal obtained by converting reflected light from an original into an electric signal with a photoelectric conversion device to thereby obtain a sample-hold signal; an amplifying unit that amplifies the sample-hold signal to obtain an amplified signal; an analog-digital converter that digitizes the amplified signal to obtain a digital signal; a difference detecting unit that detects a difference between a black-level detection value of the digital signal and a black-level target value; an selecting unit that selects an adjustment coefficient among a plurality of adjustment coefficients based on comparison of the difference and a reference value; and a feedback unit that subjects an offset adjustment value based on the adjustment coefficient selected by the selecting unit to feedback processing.

8 Claims, 13 Drawing Sheets

U.S. PATENT DOCUMENTS

| | | |
|---|---|---|
| 2003/0016398 A1 | 1/2003 | Soeda |
| 2004/0174575 A1* | 9/2004 | Ide et al. .................... 358/505 |
| 2004/0189839 A1* | 9/2004 | McDermott ................ 348/243 |
| 2005/0270589 A1 | 12/2005 | Soeda |

FOREIGN PATENT DOCUMENTS

| | | |
|---|---|---|
| JP | 2002-209108 | 7/2002 |
| JP | 2003-198953 | 7/2003 |
| JP | 2004-15094 | 1/2004 |
| JP | 2004-080168 | 3/2004 |
| JP | 2004-222185 | 8/2004 |
| JP | 2005-102266 | 4/2005 |
| JP | 2005-159564 | 6/2005 |
| JP | 2005-176115 | 6/2005 |
| JP | 2005-236834 | 9/2005 |

OTHER PUBLICATIONS

Japanese Office Action dated Aug. 13, 2010 for corresponding Application No. 2005-350470.

* cited by examiner

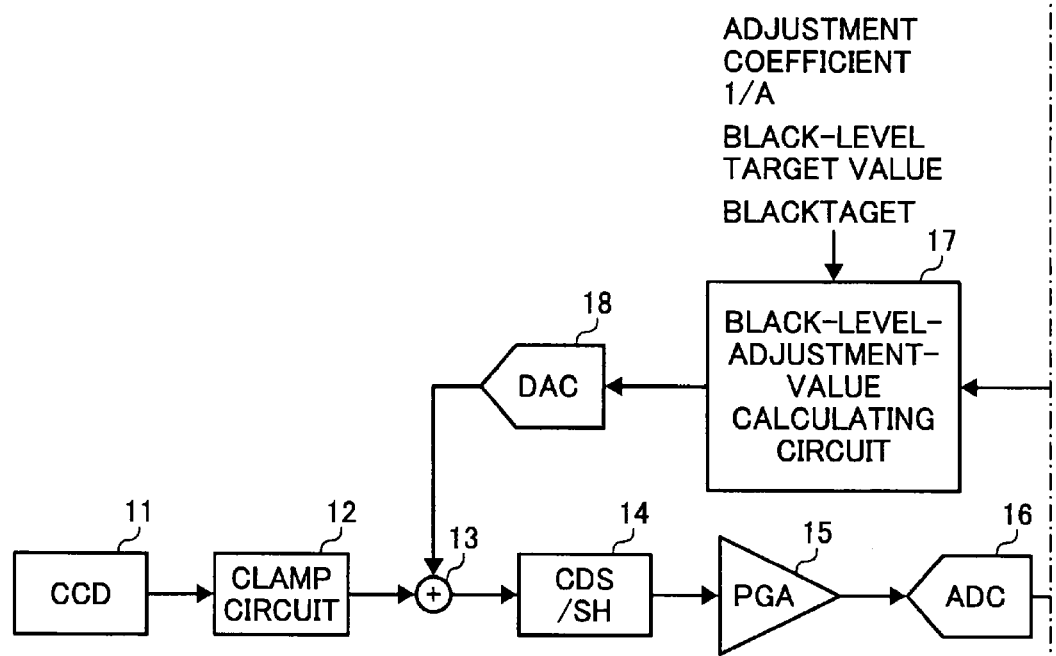

OFFSET ADJUSTING DEVICE, CORRECTING DEVICE, AND METHOD OF ADJUSTING ANALOG IMAGE SIGNAL

CROSS-REFERENCE TO RELATED APPLICATIONS

The present document incorporates by reference the entire contents of Japanese priority document, 2005-350470 filed in Japan on Dec. 5, 2005.

BACKGROUND OF THE INVENTION

1. Field of the Invention

The present invention relates to technology for correcting an analog image signal.

2. Description of the Related Art

In an image reading apparatus, light is irradiated on an original and the original is scanned line-by-line in the main scanning direction. The light reflected from the original image is focused on a photoelectric conversion device (a charge coupled device (CCD)). The output of the photoelectric conversion device is subjected to signal processing thereby obtaining image information of the original. FIG. 6 is a schematic diagram of relevant parts of an image reading apparatus having a sheet-through reading function. In a constitution shown in FIG. 6, it is possible to select two kinds of reading systems. In the first reading system, when an original 55 is placed on an original placing glass 51, a lamp 57 is turned on and a first carriage 59 and a second carriage 62 are moved in the right direction by a scanner motor to perform scanning and read the original 55. In the second reading system, the lamp 57 is turned on to read an original 56 conveyed by an original conveying device 54 without moving the first carriage 59 and the second carriage 62.

In both the reading systems, reflected light from the original 55 on the original placing glass 51 lighted by a light source for lighting an original surface (a lamp 57) is focused on a sensor surface of a photoelectric conversion device (a CCD 64) by a focusing lens 63 via a first mirror 58, a second mirror 60, and a third mirror 61 for scanning the original 55 to read image information thereof. An output signal of the photoelectric conversion device (the CCD 64) is converted into digital data by an analog-digital (AD) converter. In this way, original image data is digitally read. The original image information converted into the digital data is sent to an output device and outputted as a print. Alternatively, the original image information is sent to a storing device and stored.

In the image reading apparatus shown in FIG. 6, when an original image is scanned and read by moving the carriages, there is the following method as a method of scanning an image of the original 55 in the sub-scanning direction. For example, the first carriage 59 and the second carriage 62 for scanning are moved, while a fixed relation between the carriages are maintained, in an arrow direction in the figure (the sub-scanning direction) to scan the image. As scanning speed of the respective carriages for scanning in this case, for example, when speed of the first carriage 59 is set to V, scanning speed of the second carriage 62 is designed to be V/2.

When the original is scanned in this way, prior to the reading of the original, correction data is obtained. Reading data of a reference white board for shading correction 53 provided between a sheet-through reading unit 52 and the original placing glass 51 shown in FIG. 6 is scanned to generate data for shading correction and store the data for shading correction in a memory. Image data of the original 55 or the original 56 is normalized according to the data for shading correction while being read. In this way, unevenness in a light amount distribution, unevenness in sensitivity of the CCD, fluctuation in an output, and the like in the image reading apparatus are corrected to accurately read the original image.

At the time of shading correction, processing for detecting an offset at an image data level and subtracting the offset from the image data is performed. In general, an output signal of the CCD has an offset of about 3 volts to 6 volts. To cancel this offset component, as shown in FIG. 7, an output signal of the CCD is subjected to alternating-current (AC) coupling to remove a direct current (DC) component and, then, a DC bias is applied to the output signal to set the output signal at a signal level suitable for an analog signal processing unit at a post stage. As shown in FIG. 8, this DC bias is determined in a fixed period (an assert period of CLP) in an image signal region (a region excluding a reset noise region) of an OPB section of a CCD output signal and is thereafter fixed (clamped). This DC bias voltage is a reference voltage for sample-holding an image signal. To change image data subjected to AD conversion to output data having a fixed offset after the sample-hold, the fixed offset is added to the analog image signal data after the clamp. The assert period of CLP during an input clamp period in which this clamp is performed is referred to as a black level clamp period (OPB-CLP). The addition of the offset is performed to accurately detect a black level containing a noise component and digitally subtract the black level at the time of shading correction.

However, when the offset of the CCD fluctuates, the offset level of the output image data after the AD conversion fluctuates as well. Therefore, as shown in FIG. 9, to detect a difference between an offset level of image data subjected to digital conversion and a target offset level and cancel the difference, a feedback loop for changing an analog offset amount added to image signal data after input clamp is formed. According to this feedback loop, an influence on the image data due to offset fluctuation is reduced. In FIG. 9, a CCD 11 is a photoelectric conversion device that reads an original image. A clamp circuit 12 is a circuit that holds a level of an analog image signal constant. An adding circuit 13 is a circuit that adds a feedback value to the analog image signal. A sample-hold circuit (CDS/SH) 14 is a circuit that temporarily holds a value of the analog image signal. An amplifier (PGA) 15 is an amplifier with variable amplification. An analog-digital converter (ADC) 16 is a circuit that converts the analog image signal into digital image data. A black-level-adjustment-value calculating circuit 17 is an arithmetic circuit that calculates a feedback value for adjusting an offset using a black-level target value and an adjustment coefficient. A digital-analog circuit (DAC) 18 is a circuit that calculates a difference between the black-level target value and a black level value of the digital image data.

A method of acquiring offset data is explained with reference to FIGS. 10 and 11. When the image reading apparatus is instructed to execute a scan operation, a lamp is turned on to start an original reading operation. Prior to the original reading operation, offset data of a black level subtracted from image data at the time of shading correction is acquired. As this offset data, as shown in FIG. 10, data of an OPB section (an optical shielding region) of a CCD is generally used. After the acquisition of the offset data of the black level is completed, in the case of a Book scan operation, as shown in FIG. 11, the image data is read while the first carriage moves to scan a reference white board and the original.

When the reference white board is scanned, white level data used for the shading correction is generated. The shading correction for an original reading region is executed using the white level data and black offset data. In the shading correction, an arithmetic operation described below is performed:

$$Dsh(n)=(Dorg(n)-B)/(Dw(n)-B)\times 255$$

where
Dsh(n): nth pixel data after shading correction
Dorg(n): nth pixel original data
Dw(n): nth pixel reference white board reading data
B: black level (OPB section) reading data.

Acquisition of black-level offset data is executed before a scan operation is started. When an offset level fluctuates during original reading, a deficiency of an image occurs. Therefore, offset fluctuation during original reading is coped with as follows. A difference between output data of the black level, (an OPB section or an idle transfer section) and output target data is detected for every scan for one line of the CCD. Feedback to an offset adjusting unit (a DAC) is performed for each line with fixed responsiveness given to the feedback. In this way, output data of the black level is set to a fixed level. In such an offset follow-up system, it is essential to give appropriate responsiveness with importance attached to stability to the feedback to prevent the feedback from easily following up fluctuation due to noise.

To realize a stable feedback response, a feedback amount is determined as follows. An average (D(n)) of image data in a black-level-correction-data capturing period (a BLK-SAMPLE period) is calculated to detect a difference between the average and a target level. The difference is multiplied by a fixed coefficient (1/A) to determine an adjustment value to be fed back. In other words, an arithmetic operation of the following equation is performed:

$$DAC(n+1)=DAC(n)+(BLACKTARGET-D(n))\times(1/A)$$

where
DAC(n+1): Feedback amount to the DAC in the next line
DAC(n): Feedback amount to the DAC in the present line
BLACKTARGET: Black-level target value
D(n): Black-level reading level in the present line
1/A: Adjustment coefficient
n: Line number.

In this way, in reading an original image with a scanner, generation of black level data used for black level subtraction at the time of shading correction is executed before an original reading operation is started. As measures for coping with offset fluctuation during original reading, a difference between output data of a black level and an output target data is detected and feedback to the offset adjusting unit (the DAC) is performed with fixed responsiveness given to the feedback to set the output data of the black level to a fixed level. The responsiveness is appropriately set to prevent the feedback from following up fluctuation due to noise. When fluctuation in an offset is gentle, it is easy to set the appropriate responsiveness and it is possible to perform sufficient offset adjustment. Several examples of conventional technologies related to this are described below.

An "imaging apparatus" disclosed in Japanese Patent Application Laid-Open No. 2003-198953 is an imaging apparatus with which an image is not deteriorated even if intense light enters near a shielding area (an optical black (OB) area) of an imaging unit. The imaging unit has a light receiving area formed by a plurality of pixels for performing photoelectric conversion and a shielding area formed by a plurality of pixels for performing photoelectric conversion, which are shielded to form a black reference signal. The shielding area of the imaging unit is divided into a plurality of blocks. Outputs of the respective blocks of the shielding area are integrated. Integral values of the respective blocks are compared by a shielding-area-abnormality detecting unit to detect abnormalities of the pixels in the shielding area.

A "digital still camera" disclosed in Japanese Patent Application Laid-Open No. 2004-080168 reduces darkening due to a black level difference between an effective pixel area and an OB area. Optical information of condensed light is photoelectrically converted and amplified by a CCD and converted into a digital code by an A/D conversion circuit. A signal level of the OB area is set to zero with an OB clamp circuit and an offset amount is added to the signal level. Signal levels of the OB area are integrated and averaged. An amount identical with the integration average is added to or subtracted from a video signal.

An "imaging apparatus" disclosed in Japanese Patent Application Laid-Open No. 2004-222185 is an imaging apparatus that can clamp an imaging signal at a stable reference level and obtain a satisfactory image. A CCD has an effective imaging area for receiving imaging light from a subject and a shielded optical area (an OB area) around the effective imaging area. A vertical OB integration circuit integrates signal levels of respective blocks of a vertical OB area divided into a plurality of blocks. When it is judged from an integration result of the vertical OB integration circuit that the sun is located at the right end of the effective imaging area, a clamp position is determined as a left-side vertical OB area. Based on the determination, a clamp pulse corresponding to the left-side vertical OB area is generated in a clamp pulse generating circuit. An imaging signal is clamped based on the clamp pulse.

A "solid-state imaging device" disclosed in Japanese Patent Application Laid-Open No. 2005-102266 is a CCD-type solid-state imaging device having a driving circuit built therein that can be driven at high speed, consumes low power, and is highly integrated and capable of being driven at a single power-supply pulse. Vertical charge transfer is performed by a timing generating unit and a driving-pulse generating unit that generates a negative pulse. Vertical scanning is performed by a row-selection control unit and a transfer pulse generating unit that applies a high-voltage transfer pulse to a selected row. After a charge is amplified and held by an amplifying unit provided for each vertical transfer unit, horizontal scanning is performed by a horizontal scanning circuit. A vertical-charge transfer unit has a charge-transfer control unit. Both sweep-out of unnecessary charges from a reset switch and limitation of a band of an amplifier are realized.

A "smear correction method for a CCD solid-state imaging device" disclosed in Japanese Patent Application Laid-Open No. 2005-159564 is a method that makes it possible to relax overcorrection at the time of detection of a large smear by controlling noise in the horizontal direction of a smear signal extracted from a smear detection line and applying proper gain adjustment to the smear signal. Gain adjustment is applied to the smear signal extracted from the smear detection line to reduce a level of the large smear signal. Median values of noise are sequentially detected from respective designated areas in the horizontal direction of the smear signal to control noise in the horizontal direction of the smear signal.

An "imaging apparatus" disclosed in Japanese Patent Application Laid-Open No. 2005-176115 is an imaging apparatus that can accurately reproduce a black level of an effective pixel section even if a part of an optical black (OB) signal of an imaging device is not an accurate black level signal. According to an imaging condition and a subject, an optical black (OB) area referred to in calculating a black level is switched. An abnormal signal generated in the OB area is detected. The OB area in which the abnormal signal is generated is not used as digital clamp data for digital clamp.

However, in the conventional offset adjusting method, it is difficult to realize both responsiveness to sudden fluctuation in an offset and stability. Usually, since the offset follow-up setting with importance attached to stability is performed, when sudden offset fluctuation occurs, offset adjustment does not follow up the offset fluctuation. When an offset of the CCD suddenly fluctuates because of a smear (light leakage), in the offset follow-up setting with importance attached to stability, offset adjustment does not follow up the sudden offset fluctuation. Thus, as shown in FIG. 12, fluctuation in density of an image occurs over several tens lines. To follow up the sudden offset fluctuation, it is necessary to give high-speed responsiveness to offset adjustment. Then, as shown in FIG. 13, offset adjustment responds to fluctuation due to noise. As a result, an image tends to be deteriorated by noise.

SUMMARY OF THE INVENTION

It is an object of the present invention to at least partially solve the problems in the conventional technology.

According to an aspect of the present invention, an offset adjusting device includes a sample-hold unit that sample-holds an analog image signal obtained by converting reflected light from an original into an electric signal with a photoelectric conversion device to thereby obtain a sample-hold signal; an amplifying unit that amplifies the sample-hold signal to obtain an amplified signal; an analog-digital converter that digitizes the amplified signal to obtain a digital signal; a difference detecting unit that detects a difference between a black-level detection value of the digital signal and a black-level target value; an selecting unit that selects an adjustment coefficient among a plurality of adjustment coefficients based on comparison of the difference and a reference value; and a feedback unit that subjects an offset adjustment value based on the adjustment coefficient selected by the selecting unit to feedback processing.

According to another aspect of the present invention, an offset correcting device includes a sample-hold unit that sample-holds an analog image signal obtained by converting reflected light from an original into an electric signal with a photoelectric conversion device to thereby obtain a sample-hold signal; an amplifying unit that amplifies the sample-hold signal to obtain an amplified signal; an analog-digital converter that digitizes the amplified signal to obtain a digital signal; a difference detecting unit that detects a difference between a black-level detection value of the digital signal and a black-level target value; a selecting unit that selects a correction coefficient from among a plurality of correction coefficients based on comparison of the difference and a reference value; and a correcting unit that adds an offset correction value based on the correction coefficient selected by the selecting unit to the digital signal.

According to another aspect of the present invention, a method of adjusting an offset includes sample-holding an analog image signal obtained by converting reflected light from an original into an electric signal with a photoelectric conversion device to thereby obtain a sample-hold signal; amplifying the sample-hold signal to obtain an amplified signal; digitizing the amplified signal to obtain a digital signal; detecting a difference between a black-level detection value of the digital signal and a black-level target value; selecting an adjustment coefficient among a plurality of adjustment coefficients based on comparison of the difference and a reference value; and subjecting an offset adjustment value based on the adjustment coefficient selected at the selecting to feedback processing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
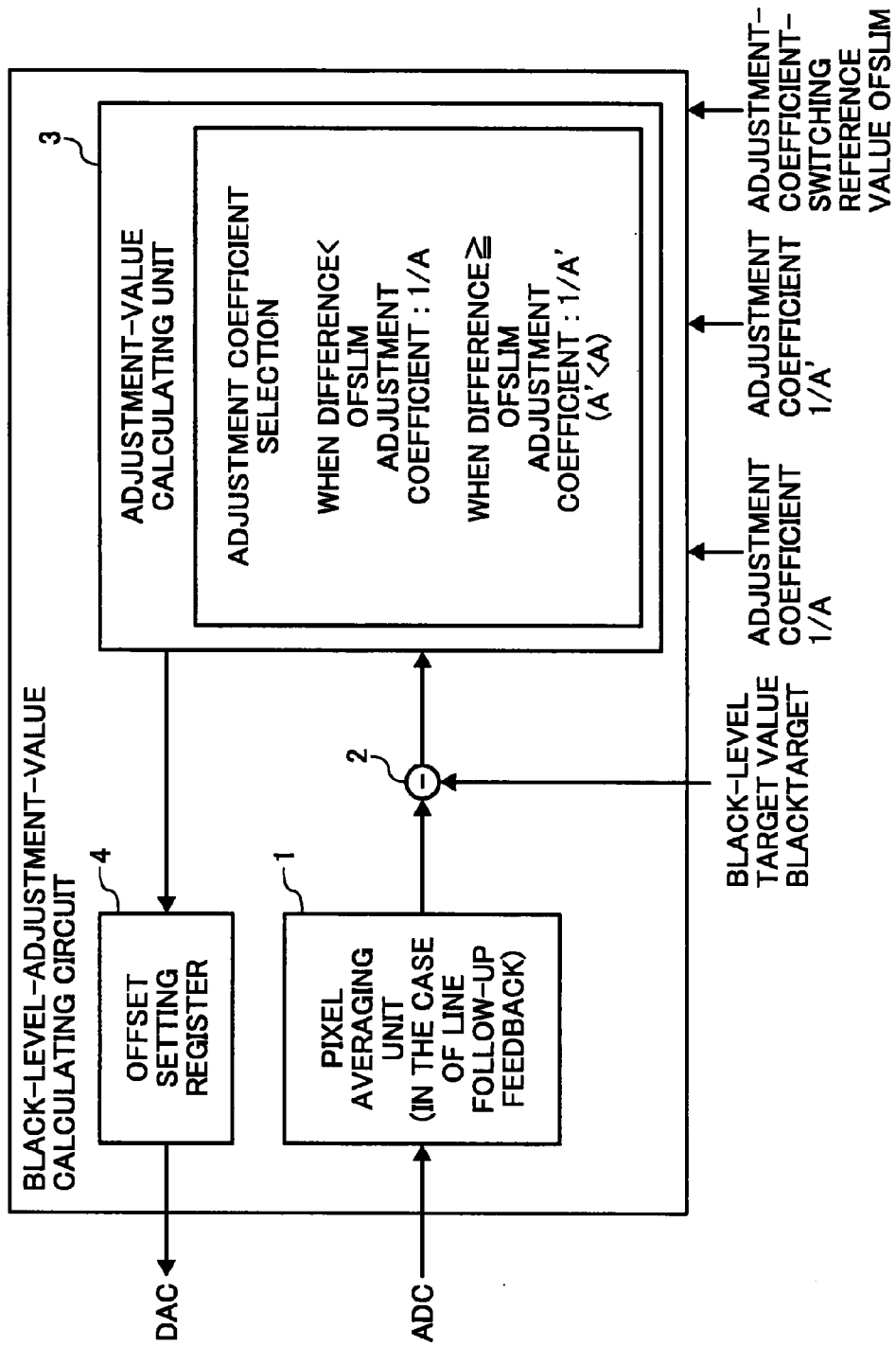
FIG. 1 is a functional block diagram of relevant parts of an offset adjusting device according to a first embodiment of the present invention.
Figure 9:
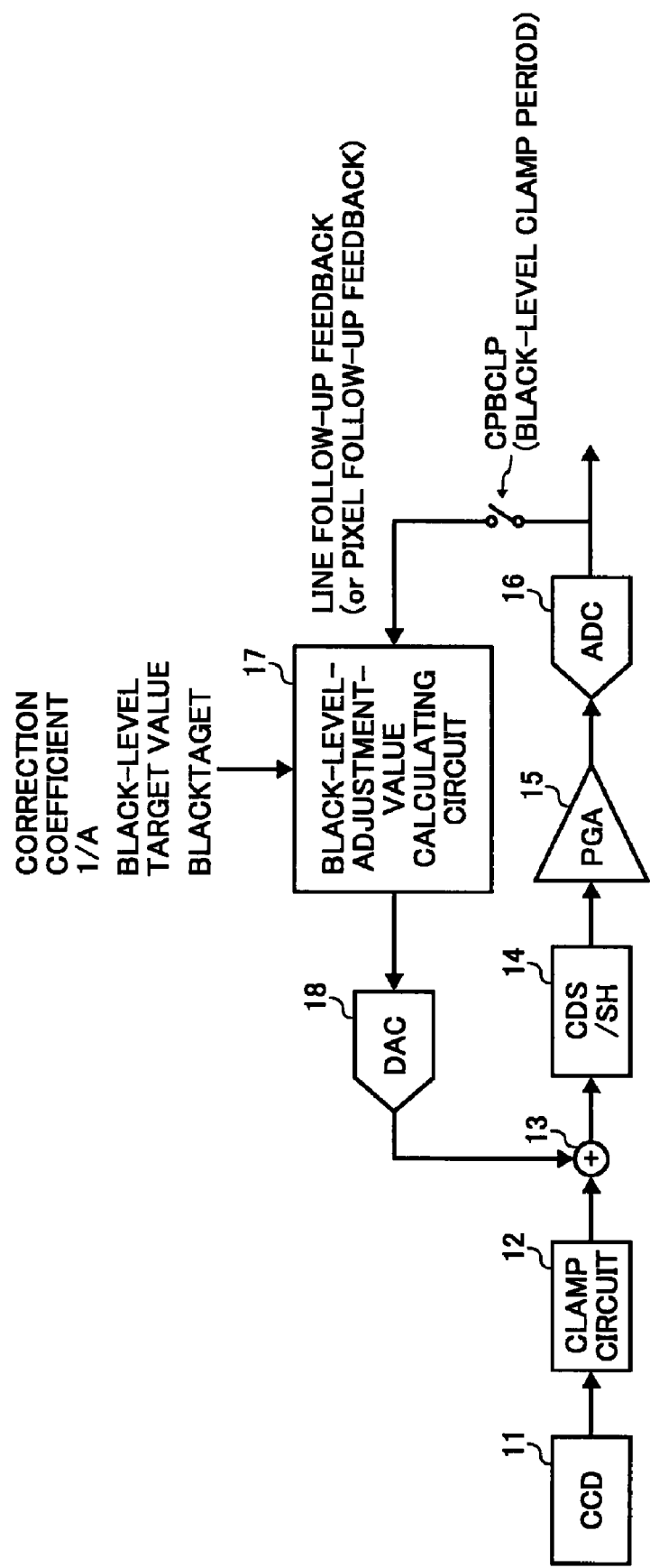
FIG. 9 is a functional block diagram of a structure of the conventional offset adjusting unit.
Figure 10:
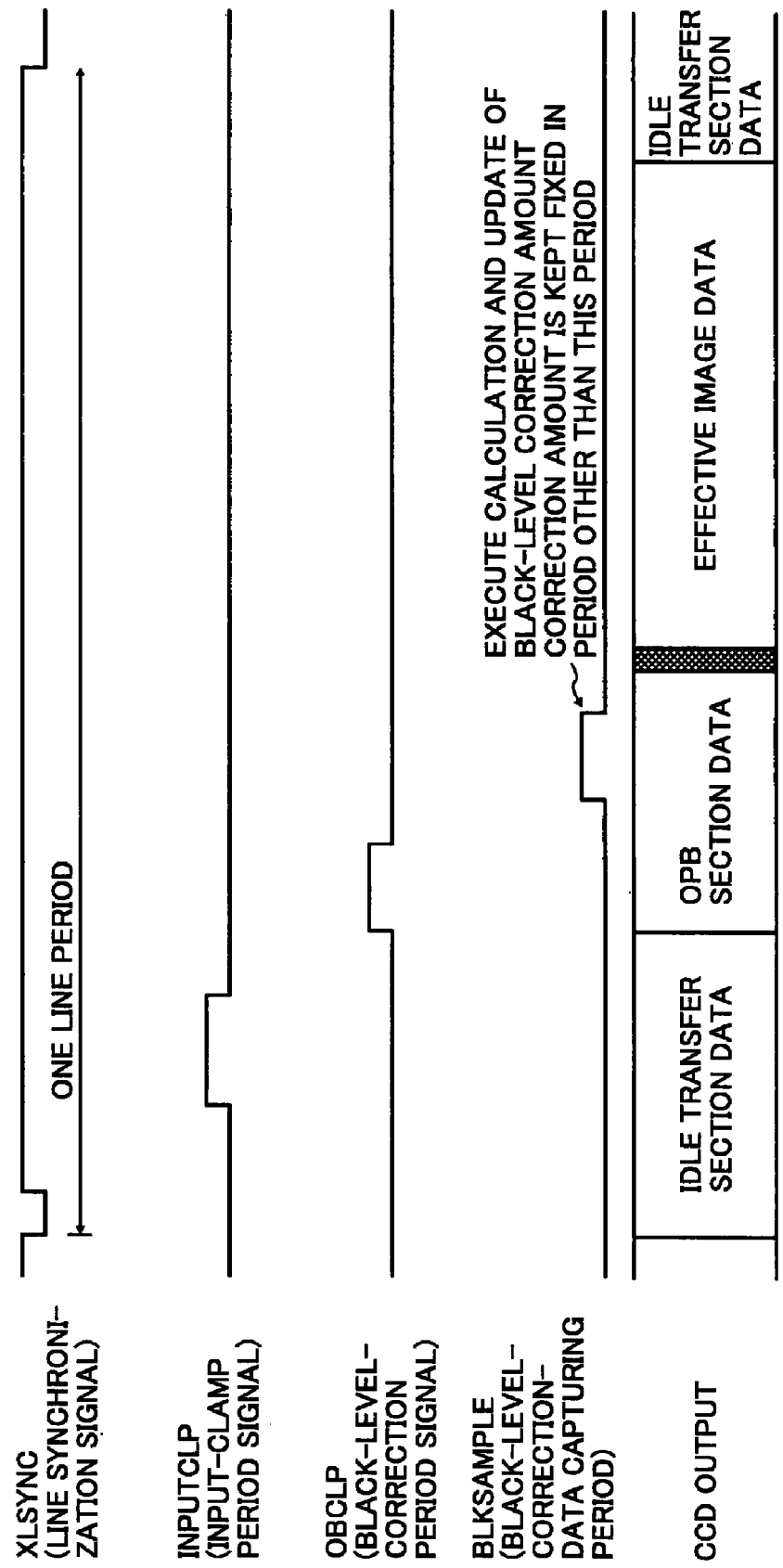
FIG. 10 is a diagram for explaining the conventional timing for acquiring offset data.
Figure 11:
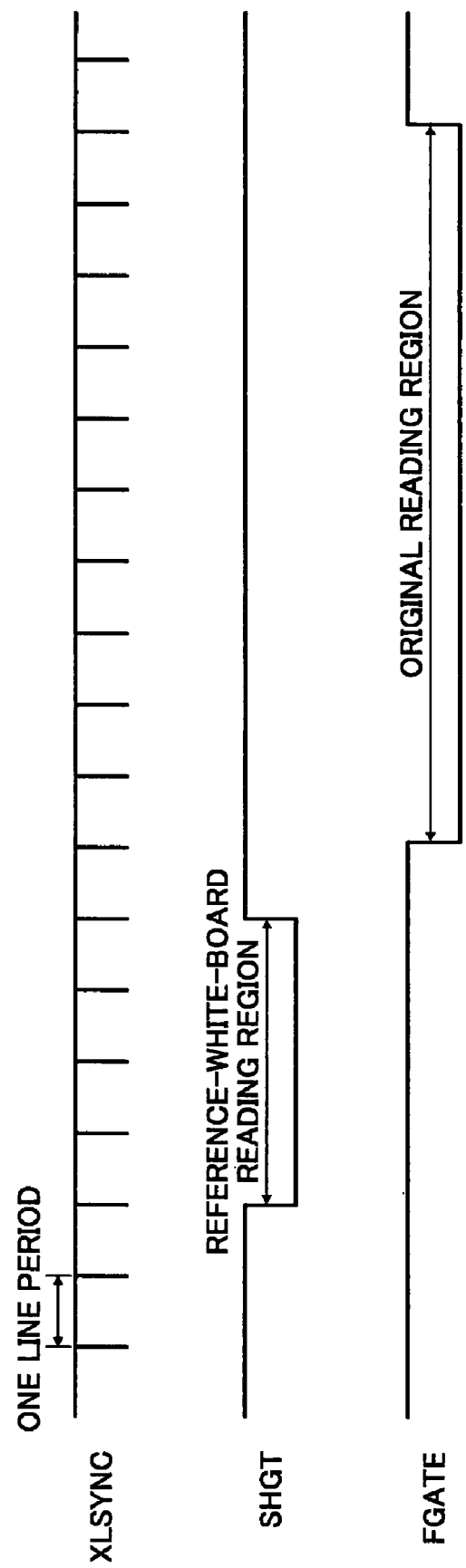
FIG. 11 is a diagram for explaining the conventional timing for reading a reference white board and original image data.
Figure 12:
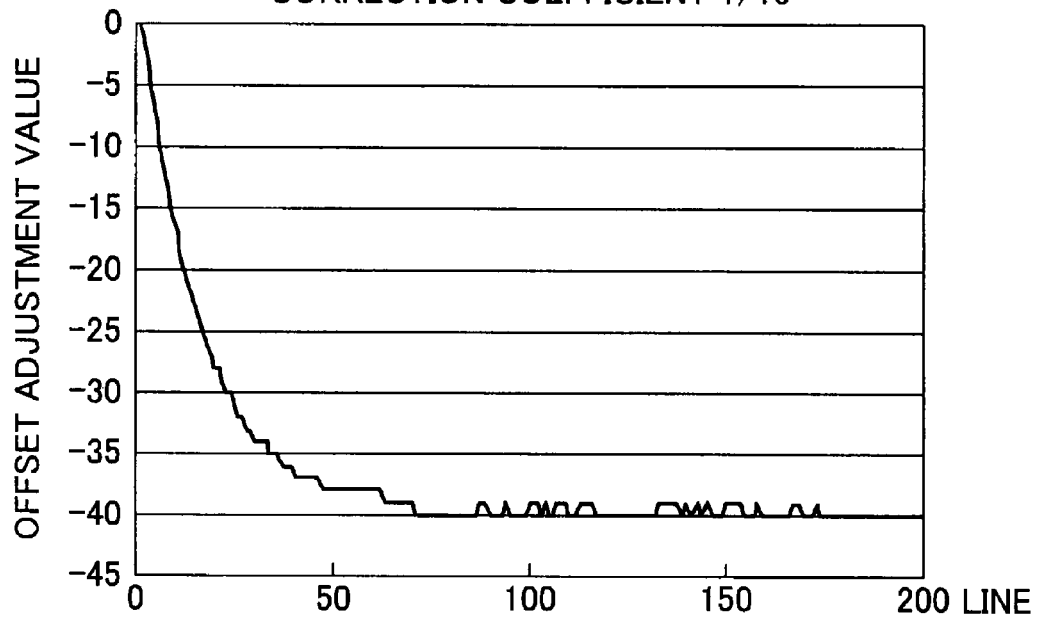
FIG. 12 is a graph of correction response at the time when the conventional correction coefficient is ¹⁄₁₆.
Figure 13:
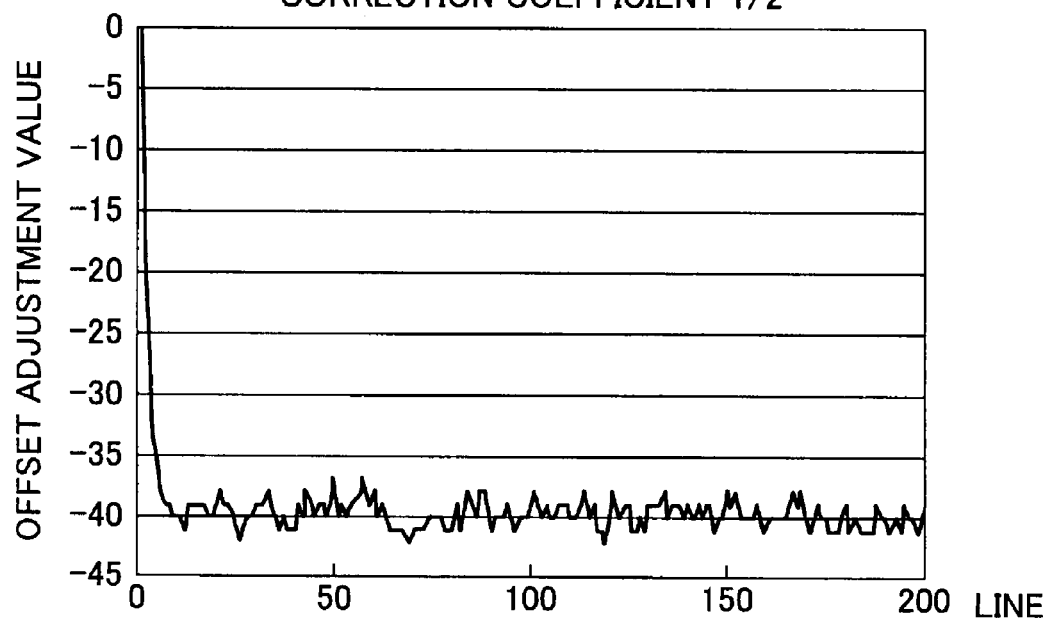
FIG. 13 is a graph of correction response at the time when the conventional correction coefficient is ½.

FIG. 1 is a functional block diagram of relevant parts of an offset adjusting device according to a first embodiment of the present invention. The offset adjusting device corresponds to a black-level-adjustment-value calculating circuit 17 in FIG. 9. A basic structure of portions other than portions related to selection of responsiveness is the same as that in the conventional apparatus shown in FIG. 9. In FIG. 1, a pixel averaging unit 1 is a unit that averages black level values in a defined section for one line to calculate a black level average. A subtracting unit 2 is a unit that subtracts the black level average from a black-level target value. An adjustment-value calculating unit 3 is a unit that calculates an offset adjustment value based on a difference. An offset setting register 4 is a register that holds the offset adjustment value calculated.

Figure 2:
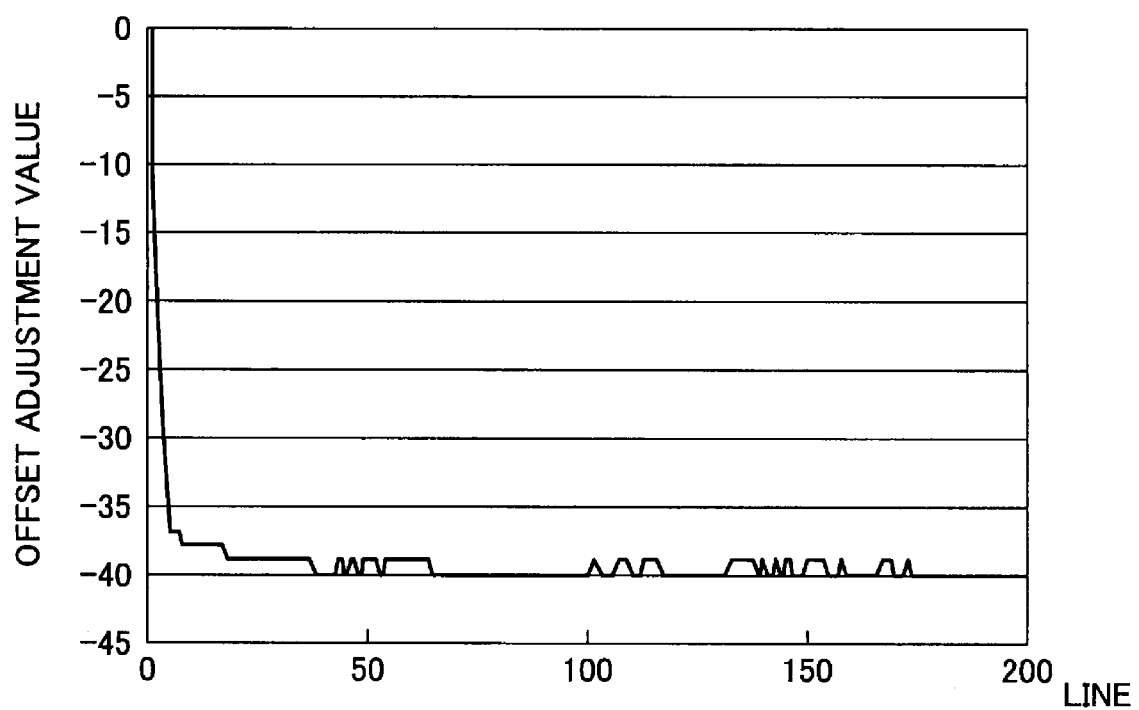
FIG. 2 is a graph of an adjustment response at the time when an adjustment coefficient is switched from ½ to ¹⁄₁₆ in the offset adjusting device according to the first embodiment.
Figure 3:
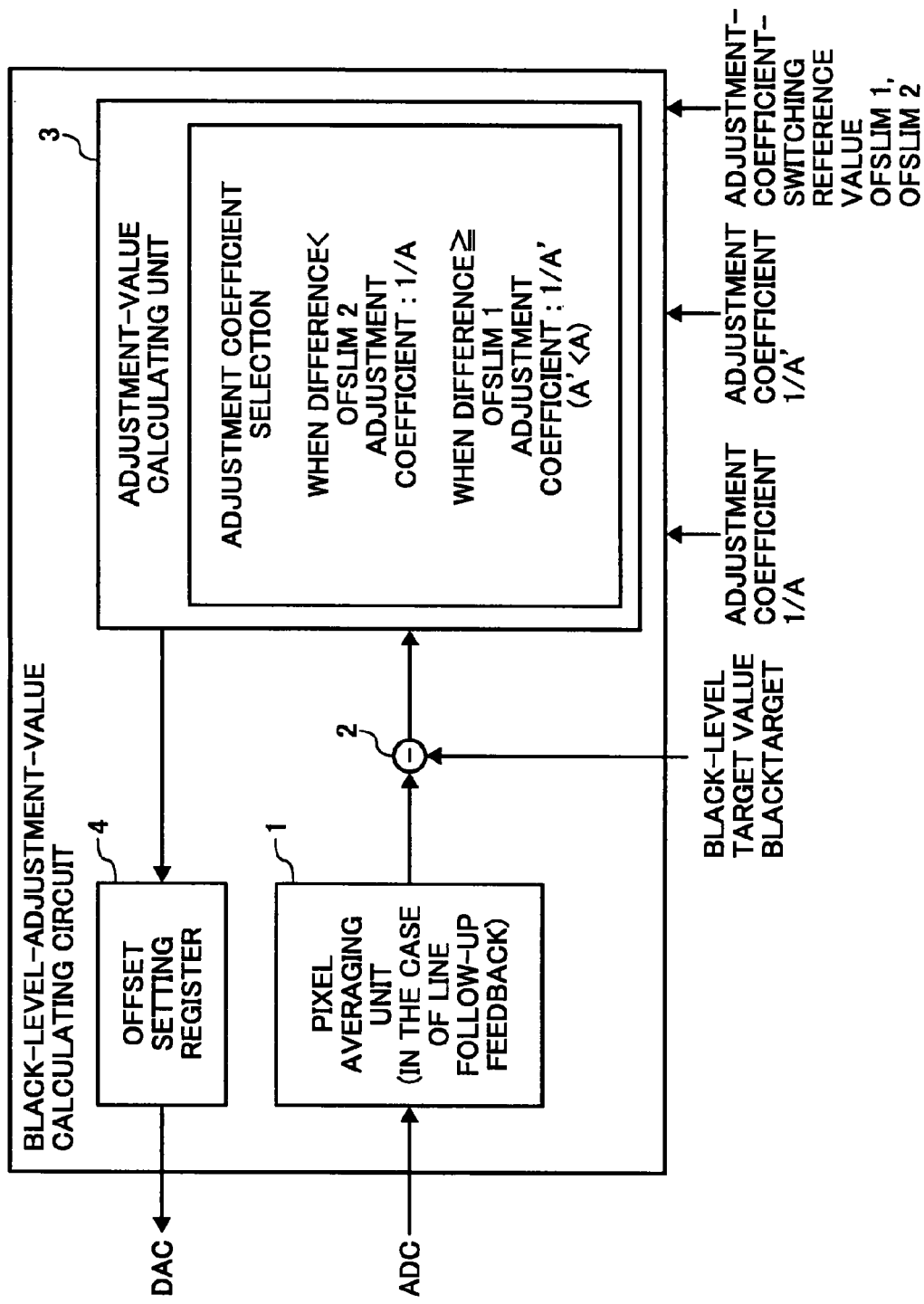
FIG. 3 is a functional block diagram of a structure of a unit that switches the adjustment coefficient of the offset adjusting device according to the first embodiment.
Figure 4:
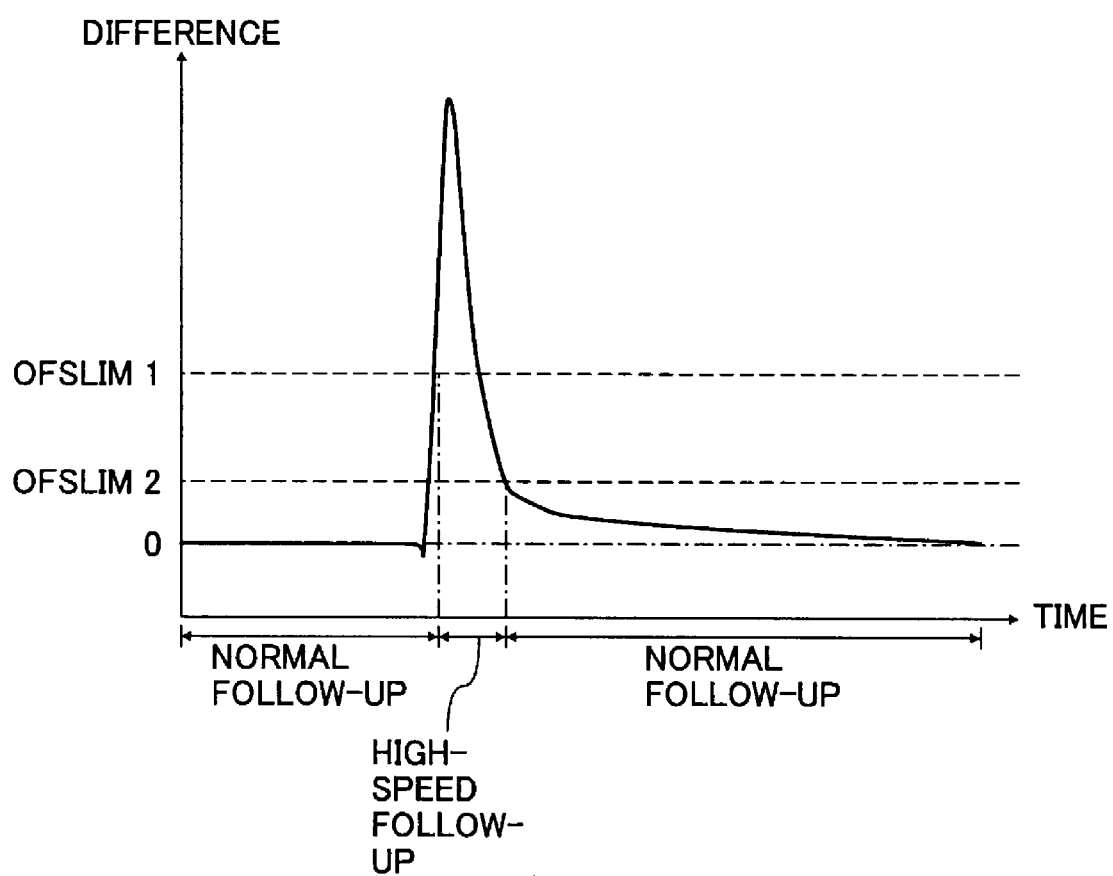
FIG. 4 is a graph of an adjustment response at the time when the adjustment coefficient is switched to ½ and ¹⁄₁₆ in the offset adjusting device according to the first embodiment.

FIG. 2 is a graph of an adjustment response at the time when an adjustment coefficient is switched from ½ to ¹⁄₁₆. FIG. 3 is a functional block diagram of a structure of an offset adjusting device including a unit that switches the adjustment coefficient. In FIG. 3, the pixel averaging unit 1 is a unit that averages black level values in a defined section for one line to calculate a black level average. The subtracting unit 2 is a unit that subtracts the black level average from a black-level target value. The offset setting register 4 is a register that holds an offset adjustment value calculated. The adjustment-value calculating unit 5 is a unit that calculates an offset adjustment value based on a difference and two reference values. FIG. 4 is a graph of an adjustment response at the time when the adjustment coefficient is alternately switched to ½ and ¹⁄₁₆.

Operations of the offset adjusting device constituted as described above are explained. First, a method of changing responsiveness is explained with reference to FIG. 1. When a difference (an absolute value of a difference) of an average of black levels detected in a fixed period (an OPB section or an idle transfer section) for each line and the black level target value is equal to or larger than a reference value (OFSLIM), follow-up response speed is changed to follow up offset fluctuation at high speed. When the difference decreases to be equal to or smaller than the reference value as a result of following up the fluctuation at high speed, the responsiveness is changed to the responsiveness at the normal time. When the difference is smaller than OFSLIM, the adjustment coefficient is set as 1/A. When the difference is equal to or larger than OFSLIM, the adjustment coefficient is set as 1/A'. A' is smaller than A. Consequently, both responsiveness and stability at the time of the offset fluctuation are realized.

A response characteristic is explained with reference to FIG. 2. When the difference is equal to or larger than the reference value (OFSLIM), the adjustment coefficient is set as ½ (A'=2) to bring the offset adjusting device into a high-speed response state. Thus, the difference suddenly decreases. When the difference is smaller than the reference value, the adjustment coefficient is changed from ½ to ¹⁄₁₆ (A=16) to bring the offset adjusting device into a normal response state. Then, the response slows down, the fluctuation decreases, and the offset is stabilized.

Offset adjustment at the time when two reference values are set is explained with reference to FIG. 3. It is possible to individually set a high reference value (OFSLIM1) for switching the response state to the high-speed response state and a low reference value (OFSLIM2) for switching the response state from the high-speed response state to the normal response state. In this way, it is possible to prevent frequent switching to the high-speed response due to noise near the reference values and cause the offset adjusting device to operate stably. When the difference is smaller than OFSLIM2, the adjustment coefficient is set as 1/A. When the difference is equal to or larger than OFSLIM1, the adjustment coefficient is set as 1/A'. When the difference is larger than OFSLIM2 and smaller than OFSLIM1, the adjustment coefficient is not changed. OFSLIM2 is smaller than OFSLIM1 and A' is smaller than A. In this way, it is possible to more satisfactorily realize responsiveness and stability at the time of offset fluctuation. Similarly, it is also possible to set three or more reference values and adjustment coefficients.

An adjustment response at the time when the adjustment coefficient is switched to ½ and ¹⁄₁₆ is explained with reference to FIG. 4. In a state in which the difference is smaller than the low reference value (OFSLIM2), the adjustment coefficient is ¹⁄₁₆ (A=16) and a follow-up characteristic is a normal follow-up characteristic. When the difference increases and exceeds the low reference value (OFSILM2), the adjustment coefficient is not changed from ¹⁄₁₆ and the follow-up characteristic is still the normal follow-up characteristic. This is for the purpose of preventing frequent switching to the high-speed response due to noise near the low reference value and causing the offset adjusting device to operate stably. When the difference further increases to be equal to or larger than the high reference value (OFSLIM1), the adjustment coefficient is switched to ½ (A'=2). Here, the follow-up characteristic is changed to a high-speed follow-up characteristic and the difference promptly decreases to be close to 0. Even if the difference decreases to be smaller than the high reference value (OFSLIM1), the adjustment coefficient is not changed from ½ and the follow-up characteristic is still the high-speed follow-up characteristic. This is for the purpose of reducing the difference to be close to 0 as promptly as possible. When the difference further decreases to be smaller than the low reference value (OFSLIM2), the adjustment coefficient is switched to ¹⁄₁₆, the follow-up characteristic is changed to the normal follow-up characteristic, and the difference decreases to be close to 0 while stably shifting.

In detection of a black level, an average in a detection period (OPBCLP) is calculated for each output line (in the case of a two-line output, for each of even number pixels and odd number pixels) of the CCD to reduce an influence of a noise component. It is possible to perform highly accurate adjustment by setting the number of pixels for averaging as large as possible according to specifications of a system. A difference between the average and a target value may be detected, integrated, and fed back by a unit of one line or one pixel. In this case, since the number of times of arithmetic operations increases, a value smaller than that in a line-unit arithmetic operation is set as the adjustment coefficient 1/A. When the number of follow-up pixels per one line is sufficiently large and S/N of black-level image data is satisfactory, it is possible to perform setting with better responsiveness by performing a follow-up arithmetic operation in pixel units.

It is possible to constitute the offset adjusting device as a signal processing IC. It is also possible to describe a processing procedure for the offset adjusting method as a computer program and execute the computer program in a computer. It is also possible to record the computer program in a recording medium and install the computer program in an image processing apparatus that a user intends to use.

As described above, in the first embodiment, the offset adjusting device detects a difference between a black-level average and a black-level target value, selects a high-speed response when the difference is equal to or larger than a reference value, selects a normal response when the difference is smaller than the reference value, and performs feedback processing to set an offset level at a fixed level. This makes it possible to reduce fluctuation in density of an image due to sudden fluctuation in an offset and prevent occurrence of an abnormal image.

Figure 5B:
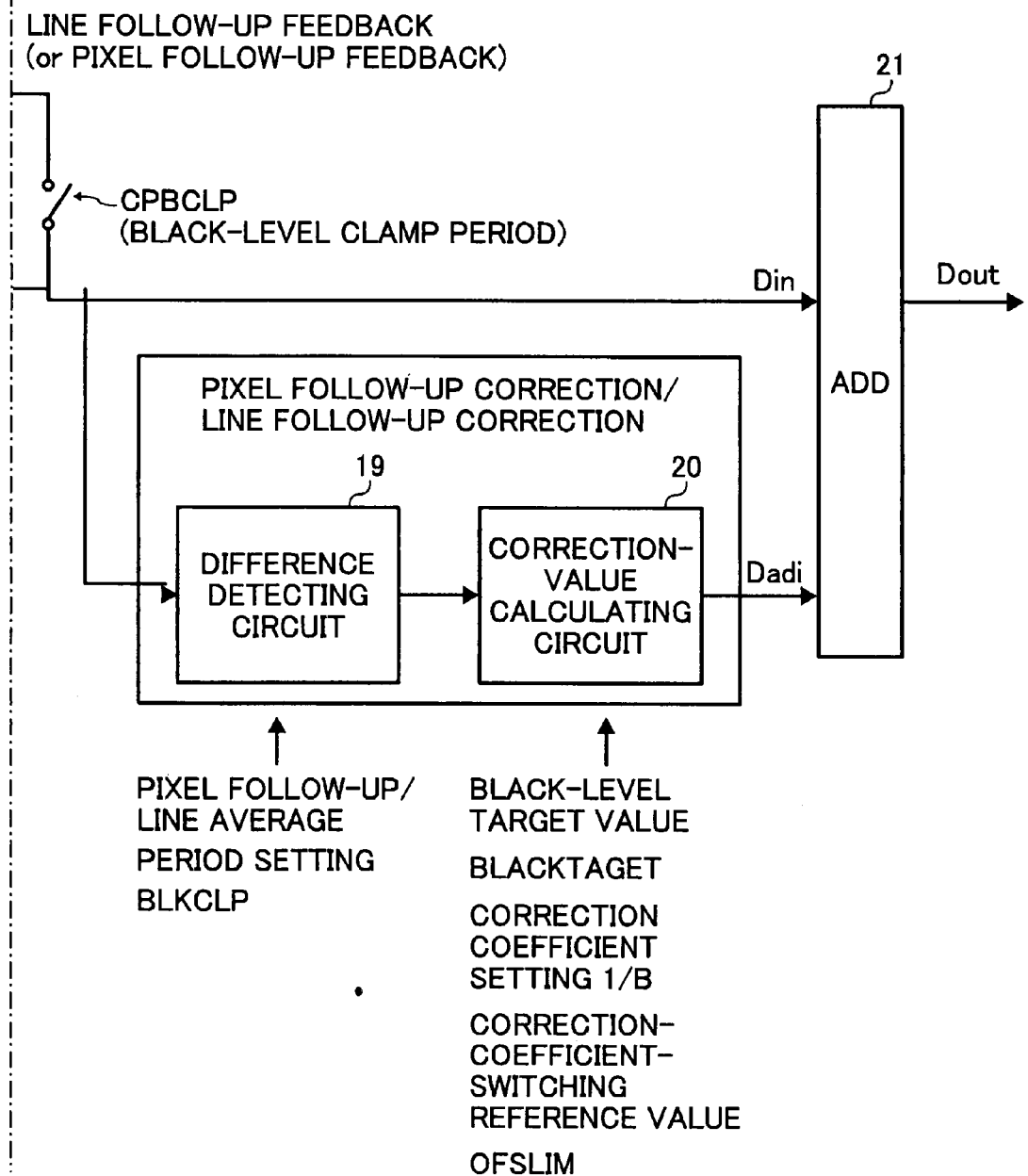
FIG. 5 is a functional block diagram of a structure of an offset correcting device according to a second embodiment of the present invention.
Figure 6:
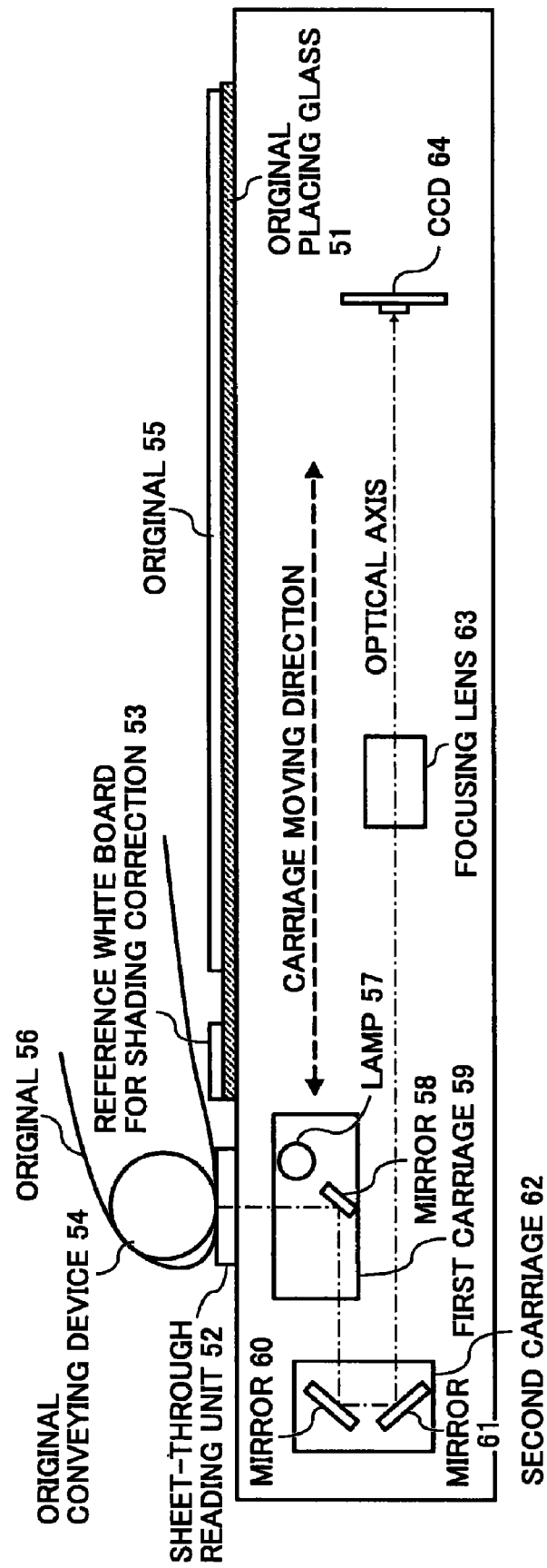
FIG. 6 is a schematic diagram of a main part of the conventional image reading apparatus.
Figure 7:
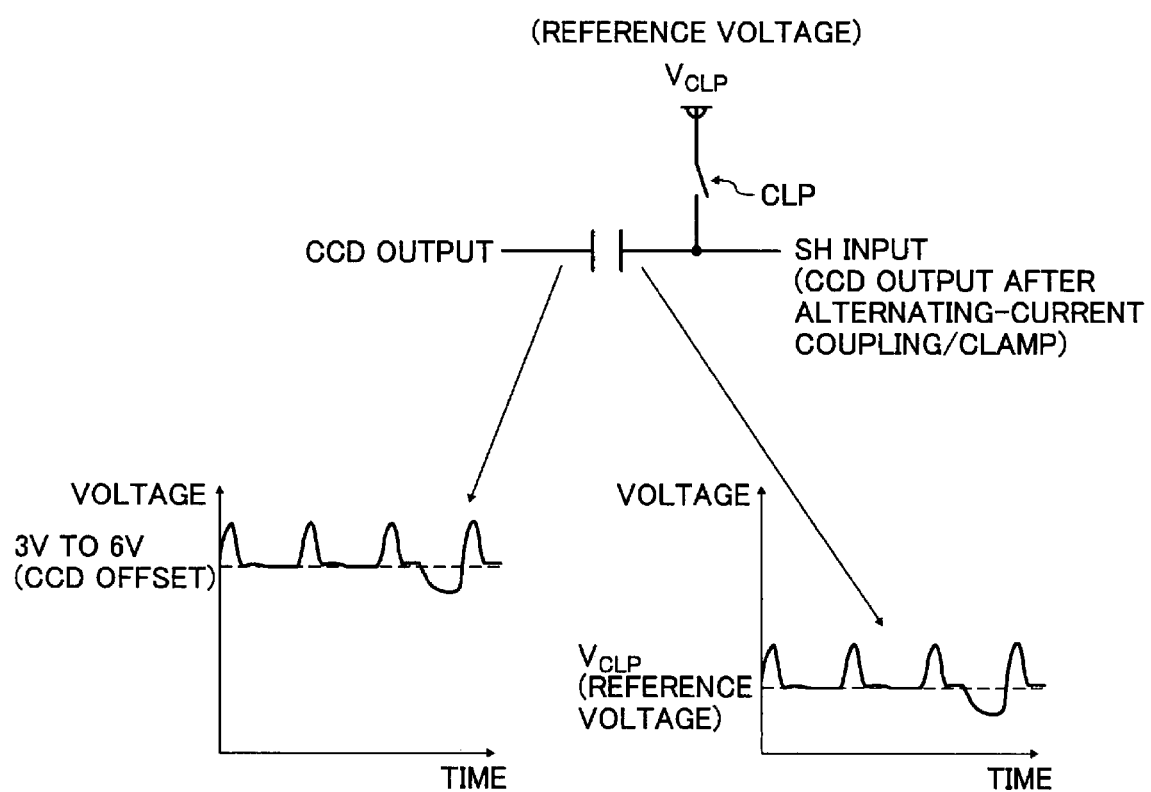
FIG. 7 is a diagram for explaining operations of the conventional clamp circuit.
Figure 8:
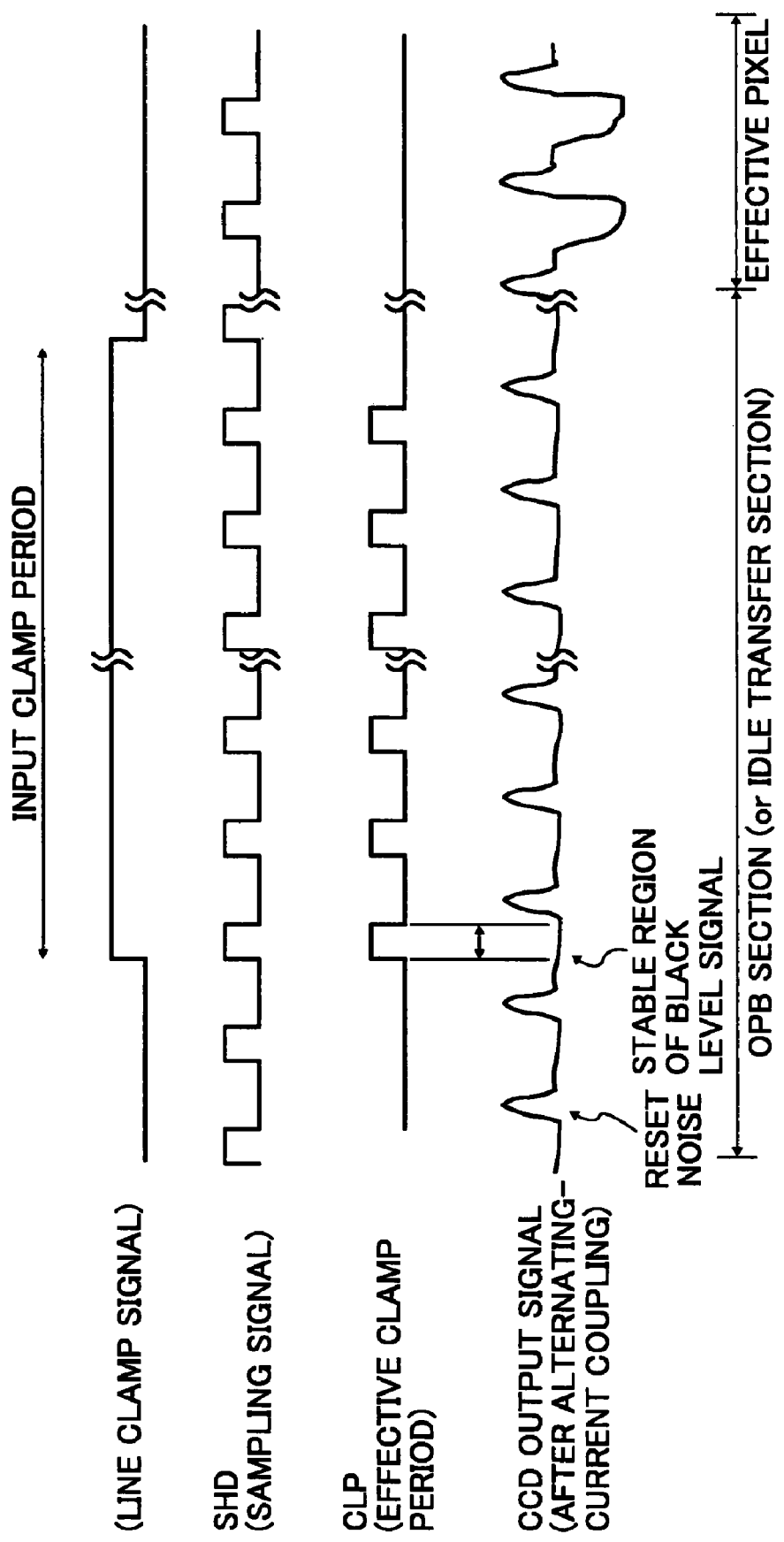
FIG. 8 is a timing chart of the conventional clamp operation.

FIG. 5 is a functional block diagram of a structure of an offset correcting device according to a second embodiment of the present invention. A basic structure of the offset correcting device other than portions related to digital correction of an offset is the same as that of the offset correcting device according to the first embodiment. In FIG. 5, a CCD 11 is a photoelectric conversion device that reads an original image. A clamp circuit 12 is a circuit that holds a level of an analog image signal constant. An adding circuit 13 is a circuit that adds a feedback value to the analog image signal. A sample-hold circuit 14 is a circuit that temporarily holds a value of the analog image signal. An amplifier 15 is an amplifier with variable amplification. An ADC 16 is a circuit that converts the analog image signal into digital image data. A black-level-adjustment-value calculating circuit 17 is an arithmetic circuit that calculates a feedback value for adjusting an offset according to a black-level target value and an adjustment coefficient. A DAC 18 is a circuit that converts a digital value into an analog value. A difference detecting circuit 19 is a circuit that calculates a difference between the black-level target value and a black level value of the digital image data. A correction-value calculating circuit 20 is an arithmetic circuit that calculates a correction value according to a correction-coefficient-switching reference value and a correction coefficient. An adding circuit 21 is a circuit that adds the correction value to the digital image data.

Operations of the offset correcting device according to the second embodiment are explained below. A digital correction unit including the difference detecting circuit 19, the correction-value calculating circuit 20, and the adding circuit 21 is provided separately from a feedback circuit that performs analog offset adjustment. The difference detecting circuit 19 detects a difference (an absolute value of a difference) between the black level value of the digital image data and the black level target value. The correction-value calculating circuit 20 performs the following arithmetic operation to digitally execute correction of a black level:

$$Dout(m)=Din(m)+Dadj(n)$$

where

Dout(m): Output data of the digital correction unit
Din(m): Input data to the digital correction unit
m: Pixel number
n: Line number.

$$Dadj(n+1)=Dadj(n)+(BLACKTARGET-D(n))\times(1/B)$$

where

Dadj(n+1): Correction value in the next line
Dadj(n): Correction value in the present line
BLACKTARGET: Black-level target value
D(n): Black-level average value in the present line
1\B: Correction coefficient.

In performing digital correction, when it is possible to secure a dynamic range of digital image data, analog feedback may be executed or may not be executed. When the analog feedback is performed, a correction coefficient with importance attached to stability is set. In digital correction unit, when a black-level average obtained by detecting black level values in a fixed period (BLKCLP: an OPB section or an idle transfer section) for each line and averaging the black level values and the black-level target value exceeds a reference value (OFSLIM), a correction value is set large to increase response speed and correct an offset at high speed. Selection of a correction coefficient is performed as follows. When the difference is smaller than OFSLIM, the correction coefficient is set as 1/B. When the difference is equal to or larger than OFSLIM, the correction coefficient is set as 1/B'. B' is smaller than B. When the offset is corrected at high speed, when the difference decreases to be equal to or smaller than the reference value, responsiveness is changed to responsiveness at the usual time. This makes it possible to realize both responsiveness and stability at the tome of offset fluctuation.

In the digital correction, depending on a direction of fluctuation in an offset, a dynamic range is spoiled with respect to adjustment in an analog amount. However, in correction in pixel units, since there is no shift of a phase due to feedback, it is possible to perform higher-speed correction. In detection of a black level value, an average in a detection period (OPB-CLP) is calculated for each output line (in the case of a two-line output, for each of even number pixels and odd number pixels) of the CCD to reduce an influence of a noise component. It is possible to perform more highly accurate correction by setting the number of pixels for averaging as large as possible according to specifications of a system.

By making it possible to individually set a high reference value (OFSLIM1) for switching a correction state to a high-speed correction state and a low reference value (OFSLIM2) for switching the correction state from a high-speed correction state to a normal correction state, it is possible to prevent frequent switching to the high-speed correction. When the difference is smaller than OFSLIM2, the correction coefficient is set as 1/B. When the difference is equal to or larger than OFSLM1, the correction coefficient is set as 1/B'. B' is smaller than B. Moreover, a difference between the average and a target value may be detected in pixel units, integrated, and corrected by a unit of one line or one pixel. In this case, since the number of times of arithmetic operations increases, a value smaller than that in a line-unit arithmetic operation is set as the correction coefficient 1/A. When the number of follow-up pixels per one line is sufficiently large and S/N of black-level image data is satisfactory, it is possible to perform setting with better responsiveness by performing a follow-up arithmetic operation in pixel units. Similarly, it is also possible to set three or more reference values and correction coefficients.

It is possible to constitute the offset correcting device as a signal processing IC. It is also possible to describe a processing procedure for the offset correcting method as a computer program and execute the computer program in a computer. It is also possible to record the computer program in a recording medium and install the computer program in an image processing apparatus that a user intends to use.

As described above, in the second embodiment, the offset correcting device detects a difference between a black-level average of digital image data and a black-level target value, selects a high-speed response when the difference is equal to or larger than a reference value, selects a normal response when the difference is smaller than the reference value, and performs digital correction to set an offset level at a fixed level. This makes it possible to maintain the offset level at an arbitrary value.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An offset adjusting device, comprising:
a sample-hold unit configured to sample-hold an analog image signal obtained by converting reflected light from an original into an electric signal with a photoelectric conversion device to thereby obtain a sample-hold signal;
an amplifying unit configured to amplify the sample-hold signal to obtain an amplified signal;
an analog-digital converter configured to digitize the amplified signal to obtain a digital signal;
a difference detecting unit configured to detect a difference between a black-level detection value of the digital signal and a black-level target value;
an adjustment coefficient setting unit configured to set a first adjustment coefficient for a high-speed response and a second adjustment coefficient for a normal response;
a reference-value setting unit configured to set one reference value;
a selecting unit configured to select at least one of the first and second adjustment coefficients, the first adjustment coefficient selected when the difference is one of equal to and larger than the reference value and the second adjustment coefficient selected when the difference is smaller than the reference value; and a feedback unit configured to subject an offset adjustment value based on the at least one of the first and second adjustment coefficients selected by the selecting unit to feedback processing.

2. The offset adjusting device according to claim 1, wherein
the black-level detection value is an average for each line of black level values in a defined section,
the selecting unit selects the at least one of the first and second adjustment coefficients by a unit of one line, and
the feedback unit updates the offset adjustment value by a unit of one line and subjects the offset adjustment value to feedback processing.

3. The offset adjusting device according to claim 1, wherein
the black-level detection value is a black level value of image data for each pixel in a defined section of one line,
the selecting unit selects the at least one of the first and second adjustment coefficients by a unit of one pixel, and
the feedback unit updates the offset adjustment value by a unit of one pixel and subjects the offset adjustment value to feedback processing.

4. The offset adjusting device according to claim 1, wherein
the black-level detection value is a black level value of image data for each pixel in a defined period of one line,
the selecting unit selects the at least one of the first and second adjustment coefficients by a unit of one line, and
the feedback unit updates the offset adjustment value by a unit of one line and subjects the offset adjustment value to feedback processing.

5. An offset correcting device, comprising:
a sample-hold unit configured to sample-hold an analog image signal obtained by converting reflected light from an original into an electric signal with a photoelectric conversion device to thereby obtain a sample-hold signal;
an amplifying unit configured to amplify the sample-hold signal to obtain an amplified signal;
an analog-digital converter configured to digitize the amplified signal to obtain a digital signal;
a difference detecting unit configured to detect a difference between a black-level detection value of the digital signal and a black-level target value;
a correction coefficient setting unit configured to set a first correction coefficient for a high-speed response and a second correction coefficient for a normal response;
a reference-value setting unit configured to set one reference value;
a selecting unit configured to select at least one of the first and second correction coefficients, the first correction coefficient selected when the difference is one of equal to and larger than the reference value and the second correction coefficient selected when the difference is smaller than the reference value; and a correcting unit configured to add an offset correction value based on the at least a one of the first and second correction coefficients selected by the selecting unit to the digital signal,
wherein the black-level detection value is a black level value of image data for each pixel in a defined period of one line,
the selecting unit selects the at least one of the first and second correction coefficients by a unit of one line, and
the correcting unit updates the offset correction value by a unit of one line.

6. A method of adjusting an offset, the method comprising:
sample-holding an analog image signal obtained by converting reflected light from an original into an electric signal with a photoelectric conversion device to thereby obtain a sample-hold signal;
amplifying the sample-hold signal to obtain an amplified signal;
digitizing the amplified signal to obtain a digital signal;
detecting a difference between a black-level detection value of the digital signal and a black level target value;
setting a first adjustment coefficient for a high-speed response, a second adjustment coefficient for a normal response, and one reference value;
selecting at least one of the first and second adjustment coefficients, the first adjustment coefficient selected when the difference is one of equal to and larger than the reference value and the second adjustment coefficient selected when the difference is smaller than the reference value; and
subjecting an offset adjustment value based on the at least one of the first and second adjustment coefficients selected at the selecting to feedback processing.

7. The method according to claim 6, wherein
the black-level detection value is at least one of an average for each line of black level values in a defined section and a black level value of image data for each pixel in a defined section of one line,
the selecting includes selecting the at least one of the first and second adjustment coefficients by a unit of one line, and
the subjecting includes updating the offset adjustment value by a unit of one line and subjecting updated to offset adjustment value to feedback processing.

8. The method according to claim 6, wherein
the black-level detection value is a black level value of image data for each pixel in a defined section of one line,
the selecting includes selecting the at least one of the first and second adjustment coefficients by a unit of one pixel, and
the subjecting includes updating the offset adjustment value by a unit of one pixel and subjecting updated offset adjustment value to feedback processing.

* * * * *